US005477022A

United States Patent [19]

Friese

[11] Patent Number: 5,477,022

[45] Date of Patent: Dec. 19, 1995

[54] ELECTRODE AND PROCESS FOR MANUFACTURING IT

[75] Inventor: Karl-Hermann Friese, Leonberg, Germany

[73] Assignee: Robert Bosch GmbH, Stuttgart, Germany

[21] Appl. No.: 78,154

[22] PCT Filed: Nov. 15, 1991

[86] PCT No.: PCT/DE91/00889

§ 371 Date: Jun. 14, 1993

§ 102(e) Date: Jun. 14, 1993

[87] PCT Pub. No.: WO92/10868

PCT Pub. Date: Jun. 25, 1992

[30] Foreign Application Priority Data

Dec. 13, 1990 [DE] Germany .......................... 40 39 778.5

[51] Int. Cl.$^{6}$ ........................... B23K 26/00; H01Y 21/02

[52] U.S. Cl. ............................... 219/121.61; 219/121.85; 219/121.6; 445/7

[58] Field of Search ......................... 219/121.65, 121.66, 219/121.85, 121.6; 445/7

[56] References Cited

U.S. PATENT DOCUMENTS

| | | | |
|---|---|---|---|
| 4,175,144 | 11/1979 | Hori et al. | 427/126 |
| 4,540,910 | 9/1985 | Kondo et al. | 313/11.5 |
| 4,904,216 | 2/1990 | Kagawa et al. | 445/7 |
| 4,963,112 | 10/1990 | Benedikt et al. | 219/121.64 X |
| 5,093,879 | 3/1992 | Bregman et al. | 385/93 |
| 5,102,700 | 4/1992 | Baldi | 427/383.7 |

FOREIGN PATENT DOCUMENTS

| | | |
|---|---|---|
| 3132814A1 | 4/1982 | Germany . |
| 3233584A1 | 3/1984 | Germany . |
| 2005649 | 4/1979 | United Kingdom . |
| WO89/01717 | 2/1989 | WIPO . |

OTHER PUBLICATIONS

"Nickel–Aluminum–eine neue leichte Super–Legierung", *Magazin Neue Werkstoffe,* Apr. 1989, p. 14.

James D. Destefani, "Advances in Inter–metallics", *Advanced Materials & Processes,* Feb. 1989, pp. 37–41.

*Primary Examiner*—Mark H. Paschall
*Attorney, Agent, or Firm*—Spencer, Frank & Schneider

[57] ABSTRACT

An electrical-discharge electrode, in particular a spark-plug electrode, having a main electrode body made of metal, the main electrode body, in particular at least its tip, is provided with an intermetallic phase composed of nickel aluminides, and a method of producing this electrical-discharge electrode.

11 Claims, No Drawings

ELECTRODE AND PROCESS FOR MANUFACTURING IT

BACKGROUND OF THE INVENTION

The invention relates to an electrical-discharge electrode, in particular spark-plug electrodes, having a main electrode body made of metal and a method of producing it.

Contemporary spark plugs have, as a rule, a central electrode and an earth electrode, the tips of the two electrodes being arranged with respect to one another in such a way that a spark gap is left free. The tips are subject to an appreciable wear as a result of the continuous spark production between the two electrodes. This problem imposes strict requirements on the high-temperature resistance, corrosion resistance and thermal expansion characteristics of the electrode tip. Spark erosion and oxidation phenomena also result in an appreciable stress.

In order to improve, in particular, the electrode tip, U.S. Patent Specification 4 540 910 therefore proposes, for example, that an interlayer which serves to compensate for the markedly different thermal expansion behaviour of electrodes and metal coatings is disposed between the metal electrode, which is composed of a nickel alloy, and a metal layer with high wear resistance, which is made of a platinum-containing alloy. This interlayer is composed of an alloy which is made up of a platinum alloy and nickel. To apply the wear-resistant metal layer to the metal electrode, the wear-resistant metal layer is first mechanically bonded to the interlayer and then the interlayer provided with the metal layer is joined to the metal electrode by resistance welding. The production expenditure necessary for this purpose and, in particular, the high material costs are appreciable, and furthermore, only the thermal expansion behaviour is improved.

German Patent Specification 31 32 814 furthermore discloses that a platelet made of noble metal, such as, for example, platinum, is applied by resistance welding to the free end face of a central electrode of a sparking plug. In the case of this central electrode, however, the problem then arises that the noble-metal platelet peels away from the central electrode as a result of stresses in the joint zone under fairly high thermal and corrosive loads. Here, again, even the material costs are appreciable.

SUMMARY OF THE INVENTION

The present invention comprising an electrical-discharge electrode having a main electrode body made of metal which is provided with an intermetallic phase in at least the region of its tip and in which the intermetallic phase is composed of nickel aluminide, and the method for producing these electrical discharge electrodes, makes use of the advantages of the known IP (intermetallic-phase) materials. Intermetallic phases are understood as meaning compounds of metals with ordered atomic distributions. These intermetallic phases are stronger than metal alloys and more oxidation-resistant than non-noble-metal alloys and more deformable than ceramic, even at high temperatures. Their properties are therefore between those of metal and ceramic.

For more detailed explanation of the intermetallic phases, references is made to "Magazin Neue Werkstoffe 1/89", pages 15 et seq. and to the article entitled "Advances in Intermetallics" in Advanced Material & Processes 2/89. Intermetallic phases are, for example, titanium aluminides and nickel aluminides.

The electrode may be composed completely of the IP material or carry a tip made of IP material on an electrode body made of otherwise standard electrode material.

Method of producing an electrode according to the invention vary. With regard to the application of the IP-material electrode tip, there are two possible methods within the scope of the present invention. On the one hand, an IP material, i.e. an intermetallic phase itself, can be applied to the main electrode body. In this connection, nickel aluminides, such as, for example $NiAl_3$, $Ni_2Al_3$ or the like, are suitable. The join to the main electrode body is then made by known methods, such as welding or high-temperature soldering.

A further advantageous possible method is, however, to apply a material to the main electrode body for the purpose of forming an intermetallic phase and then produce a refractory, oxidation-resistant intermetallic phase at that point. Here suitable materials are, for example, aluminium or an aluminium alloy.

The material is preferably joined in both cases by alloying. In this connection, said alloying takes place, for example, by the known laser technology. If, for example, aluminium or aluminium alloys or aluminium-containing intermetallic phases, such as $NiAl_3$, $Ni_2Al_3$ or the like, are applied to main electrode bodies made of, for example, $Ni_4B_5$, Inconel or similar alloys or even to two-material electrodes having corresponding casing materials, the objective set is always to produce NiAl, optionally containing additional alloying elements, such as, for instance, chromium, manganese, silicon, molybdenum or the like.

The alloy formation or the alloying can also be done by utilising the aluminothermal effect, in which the reaction heat produced in the oxidation of aluminium is used for the alloy formation. In this case, therefore, a cermet material is produced, with corundum particles attached.

All the methods produce a coating on the main electrode body which has a high spark-erosion resistance and a high corrosion and oxidation resistance. Furthermore, an increased electrical resistance is located directly at the base of the spark in the electrode surface, and this results in an additional interference suppression action. The method itself is efficient, the material costs being lower compared with platinum plugs.

DESCRIPTION OF THE PREFERRED EMBODIMENTS

In a preferred exemplary embodiment, the intermetallic phase should also contain alloying additives. In this connection, it is possible to achieve a reduction in the electron work function by adding alkaline-earth metals.

Moreover, further alloying additives which make it ductile or deformable, may be added to the material before alloying. This can also be done by suitable pretreatment. This includes, for example, the addition of boron, in which case boron preferably evaporates during alloying. If, for example, chromium is added, the corrosion resistance of the electrode can thereby be improved.

It is within the scope of the invention that the material is mounted on the main electrode body as a platelet, cap or the like and is then, for example, alloyed. This method of production is simple and inexpensive.

The invention is also intended to comprise, for example, the use of an intermetallic phase in the production of electrodes, in particular sparking-plug electrodes.

I claim:

1. A method of making an electrode for a spark plug comprising the steps of:

a) providing an electrode body of a material comprising nickel or nickel alloy;

b) applying aluminum or an aluminum alloy to the electrode body; and c) treating the electrode body to form a nickel-aluminide intermetallic phase at least on the surface of the electrode body thereby producing a spark-plug electrode.

2. The method of claim 1 wherein the step of applying aluminum or an aluminum alloy to the electrode body includes forming a layer of aluminum or an aluminum alloy on the surface of the electrode body.

3. The method of claim 1 wherein the step of treating the electrode body to form a nickel aluminide intermetallic phase is by laser technology.

4. The method of claim 1 wherein the step of treating the electrode body to form a nickel aluminide intermetallic phase is a thermal treatment.

5. The method of claim 1 wherein the step of treating the electrode body to form a nickel aluminide intermetallic phase is restricted to an area of an electrode's surface tip.

6. The method of claim 5 wherein the step of treating the electrode's surface tip to form a nickel aluminide intermetallic phase is by laser technology.

7. The method of claim 5 wherein the step of treating the electrode's surface tip to form a nickel aluminide intermetallic phase is a thermal treatment.

8. A method of making an electrode for a spark plug comprising the steps of:

a) providing an electrode body of a material comprising nickel or nickel alloy;

b) applying aluminum or an aluminum alloy to a tip of the electrode body; and c) treating the electrode body tip to form a nickel aluminide intermetallic phase.

9. The method of claim 8 wherein the step of treating the electrode body tip is by laser technology.

10. The method of claim 8 wherein the step of treating the electrode body tip is a thermal treatment.

11. The method of claim 8 wherein the step of applying aluminum or an aluminum alloy to the electrode body includes forming a layer of aluminum or an aluminum alloy on the surface of the electrode body.

* * * * *